March 11, 1952  R. L. JACKMAN  2,588,630
TESTING APPARATUS
Filed July 29, 1949
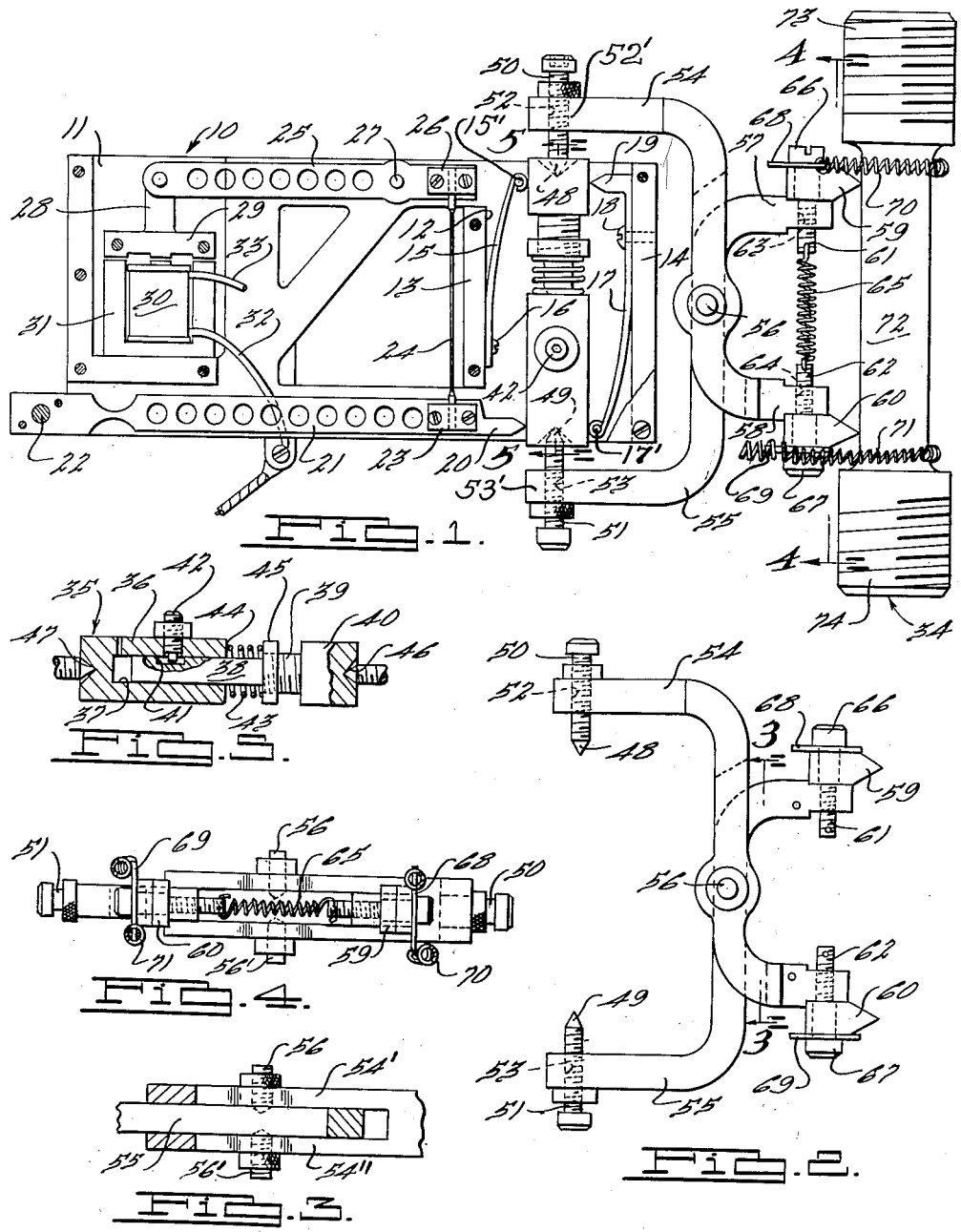
INVENTOR.
Richard L. Jackman.
BY
Harness and Harris
ATTORNEYS.

Patented Mar. 11, 1952

2,588,630

UNITED STATES PATENT OFFICE 2,588,630

TESTING APPARATUS

Richard L. Jackman, Ferndale, Mich., assignor to Chrysler Corporation, Highland Park, Mich., a corporation of Delaware Application July 29, 1949, Serial No. 107,415

5 Claims. (Cl. 33—148)

1

My invention relates to mechanical testing apparatus and more particularly to an improved attachment for apparatus which measures the expansion of an article being tested.

In the past an instrument commonly referred to as an extensometer has been employed to measure the extension of a test sample of material which is being stretched by an appropriate device. Great difficulty has arisen due to the fact once the material being tested breaks, great forces are exerted against the measuring device often causing damage.

The principle object of my invention is to provide new improved extensometers which may be used without encountering damage when the test sample breaks.

Another object of my invention is to provide an improved extensometer which is not only sturdy in construction but economical to manufacture.

Other objects and advantages will become more apparent from the following description of one embodiment of my invention, reference being had to the accompanying drawings in which:

Fig. 1 is a side elevational view of an extension indicating device in cooperation with my improved attachment.

Fig. 2 is a side elevational view of the lever members shown in Fig. 1.

Fig. 3 is a transverse view taken on the line 3—3 of Fig. 2.

Fig. 4 is a transverse view taken on the line 4—4 of Fig. 1.

Fig. 5 is a transverse sectional view taken on the line 5—5 of Fig. 1.

The particular form of my invention which I have disclosed includes an attachment for a standard extensometer. I have shown this form for the purpose of convenience. It should be realized, however, that in accordance with my invention the standard device and the attachment may be combined to form a complete new and novel extensometer and it is not my intention to be limited to the attachment only.

In the drawings, I have shown apparatus 10 commonly referred to as an extensometer which is utilized to indicate the amount of stretch imparted to a test sample by conventional testing mechanism (not shown). The extensometer 10 comprises a base portion 11 having a channel 12 disposed at one end thereof. The channel 12 is provided with wall portions 13 and 14, each of which defines the right and left hand boundaries of the channel as shown in the drawings. The extensometer 10 as disclosed in Fig. 1 of the drawings shows only the most important parts thereof for the purposes of simplicity. As may

2 be readily realized, the wall portions 13 and 14 in most commercially built extensometers move toward or away from each other so that the test sample may be placed within the channel 12 and thereafter held therein but such mechanism is not shown. The wall portion 13 is provided with a leaf spring 15, one end of which is anchored by a bolt 16 to the wall portion 13 while the other end thereof is provided with a rounded portion 15' so as to engage a sample to be placed within the apparatus 10. The wall portion 14 is provided with a leaf spring 17 which is secured to the portion 14 by a bolt 18 and is provided at one end with a knife edged projection 19 which extends outwardly into a channel at approximately the same level as the rounded end portion 15' of the spring 15. The other end of the leaf spring 17 is provided with a rounded edge portion 17' which, in cooperation with another knife edged projection 20, serves to retain the lower portion of a test sample within the channel 12. The rounded edge portion 15' of the leaf spring 15 along with the projection 19 serves to hold the upper end of the test sample within the channel 12.

The knife edged projection 20 is an integral end portion of an arm 21 which is pivoted to the base portion 11 at 22. The end portion of the arm 21 adjacent the edged portion 20 is provided with a plate 23 which engages and holds in place one end of a wire 24, the other end of which is secured to an arm 25 by a similar plate 26. The arm 25 is pivoted on the base portion 11 at 27 and has its opposite extremity from where the wire 24 is attached pivotally connected to a connector 28 which is secured to a magnetic core portion 29. It may be seen therefore that any rotation of the arm 21 downwardly about the pivot point 22 will cause the arm 25 to pivot about the pivot point 27 thereby raising the core portion 29. The core portion 29 is disposed adjacent a coil 30 which is provided with a core 31. The electrical leads 32 and 33 of the coil 30 extend out of the base portion 11 and are connected to appropriate electrical testing apparatus (not shown). It may be readily seen therefore that if a test sample, such as that shown at 34, is placed within the channel 12 so that at one end thereof, the rounded end portion 15' of the spring 15 and the knife edged projection 19 hold it in place and at its other end the rounded end portion 17' of the spring 17 and the knife edged projection 20 hold it in place, that any stretching of this test sample would cause the arm 21 to rotate in a clockwise direction, as viewed in the drawings, thereby raising the core portion 29 away from the coil 30. It may also be seen that such movement of the core portion 29 would change the effective inductivity of the coil 30 thereby varying the characteristics of the electrical testing system in which the coil 30 is incorporated. By this method, the amount of movement of the knife edged projection 20 which causes the lifting movement of the core portion 29 may be conveniently recorded by the aforementioned electrical system.

In accordance with my invention, however, I have replaced the test sample 34 with an improved extensometer attachment will conveniently and readily transfer the stretching effect on the test sample from the sample itself to the knife edged projection 20. My improved attachment includes a spring pressed plunger and barrel assembly generally designated by the numeral 35 which has a maximum external diameter equal to the diameter of the test sample and which is placed within the channel 12 in exact position that a test sample would normally take. The test sample 35 comprises a cylindrical base portion 36 provided with a centrally bored cylindrical chamber 37 which receives one end of a plunger 38. The other end of the plunger 38 is integrally connected to a threaded portion 39 of slightly larger diameter which in turn is integrally connected to a head portion 40. The head portion 40 has the same diameter as the cylindrical base portion 36, both of which have the same diameter as a test sample such as 34 which is normally tested by the extensometer 10. The plunger 38 is provided with a slot 41 which receives a set screw and bolt assembly 42, the latter being located within the side of the cylindrical base portion 36. In this manner, the plunger 38 is retained within the cylindrical chamber 37 and the size of the slot 41 is predetermined to allow axial movement between the base portion 36 and the plunger 38 but not enough to damage the extensometer. The assembly 35 is also provided with a coil spring 43 which is disposed around the right hand extremity of the plunger 38 as viewed in the drawings between the open end face 44 of the base portion 36 and a nut 45 which is threaded on the threaded portion 39. In this manner the plunger 38 is urged outwardly out of the chamber 37. The opposite extremity of the head portion 40 and the cylindrical base portion 36 are provided with conical recesses 46 and 47, respectively, which receive conically tipped ends 48 and 49 of bolts 50 and 51, respectively. The bolts 50 and 51 are threaded within threaded apertures 52 and 53 which are disposed within the end portions 52' and 53' of lever or link members 54 and 55, respectively. The lever members 54 and 55 are substantially S shaped and are pivotally connected to move relative to each other in a scissors fashion. The central portion of the lever member 54 is bifurcated forming legs 54' and 54''. The central portion of the lever member 55 passes between the legs 54' and 54'' and is pivotally connected thereto by pins 56 and 56', respectively. The opposite extremities 57 and 58 of the levers 55 and 54, respectively from which the bolts 50 and 51 are disposed, are provided with knife edged projections 59 and 60 which are secured thereto by bolts 61 and 62, respectively. The bolts 61 and 62 are disposed within threaded openings 63 and 64 in the end portions 57 and 58 and each is provided with an opening which receives one end of a coil spring 65, the latter urging the knife edged projections 59 and 60 toward each other as clearly shown in the drawings. The bolts 61 and 62 are provided with head portions 66 and 67 which retain discs 68 and 69, the latter being used to anchor coil springs 70 and 71 which hold in place the test sample 34 and urge the central portion 72 thereof against the sharp edges of the knife edged projections 59 and 60.

The tension exerted by the coil spring 43 is predetermined so that the cylindrical base portion will always be urged outwardly to maintain the conical ends 48 and 49 within the conical recess 46 and 47, respectively. The tension exerted by the coil spring 65 is predetermined to serve approximately the same function as the spring 43.

In operation the enlarged end portions 73 and 74 of the test sample 34 are placed in a stretching machine (not shown) and thereafter pulled in opposite directions causing the central portion 72 to expand or stretch. When this happens the knife edged projections 59 and 60 are also moved against the tension of the spring 65 in accordance with the movement of the central portion of the test sample. The movement of the knife edged projections 59 and 60 is transmitted through the levers 54 and 55 to the conical tips 48 and 49 of the bolts 50 and 51, respectively, causing these tips to move away from each other. This separation causes the spring 43 to maintain the tips 48 and 49 within the recesses by moving the cylindrical base portion 36 relative to the head portion 40. The relative force of the spring 43 may be equal or less than the force exerted by the spring 65 since if the force of the spring 43 were greater, the plunger 38 would be as far out of the base portion 36 as it could move and no relative movement between the two would occur. It should be kept in mind however that the knife edged portion 19 of the rounded edge portion 15' of the edge 15 retains the head portion 40 in position allowing the cylindrical base portion only to move. Movement of the cylindrical base portion 36 as heretofore pointed out causes movement of the knife edged projection 20 and the arm 21 thereby causing upward movement of the core portion 29 and a change of characteristics of the electrical test circuit.

In effect my improved attachment merely transmits the movement of the knife edged projections 59 and 60 to the extensometer. It should be noted, however, that the distance between the edges of the knife edged projections 59 and 60 is the same as between the knife edged projection 20 and the rounded end portion 15' and that the pin 56 which is the pivot point of the two levers 54 and 55 is equidistant between the opposite knife edged projections. This construction enables linear measurements of the stretch in the same manner as those measurements set forth in using only the extensometer.

It may be readily seen that the employment of my improved adaptor with the extensometer as shown safeguards the extensometer from any possible damage. Under normal operation the extensometer is suspended adjacent the sample being tested and unfortunately in most cases when the test sample is stretched beyond the breakage point and the breakage of the sample occurs, great forces are exerted against the parts disposed within the channel 12 usually causing damage thereto. However, by employing my improved adaptor breakage of the sample being tested does no more than unseat the conical tips 48 and 49 from within the conical recesses 46 and 47 thereby separating the extensometer from any mechanical linkage with the sample being tested and preventing any damage thereto. Further, the tension of the spring 65 is not sufficient to maintain the tips 48 and 49 within the recess 46 and 47 when breakage of the sample occurs. Therefore, when breakage occurs, the extensometer is completely separated from any forces which might cause damage.

Although I have shown and described my invention as an attachment to a conventional extensometer, it should be realized that the attachment and the extensometer may be made as a single piece of testing equipment without departing from the spirit of the invention.

I claim:

1. In apparatus for measuring the extension of a member to be tested, the combination of a device comprising a body portion having a channel therein, an arm pivoted on said body portion having an end portion extending into said channel and means operatively connected to said arm for indicating the amount of movement thereof, and an attachment for said device comprising two relatively movable parts disposed within said channel, one of said parts being fixed relative to said base portion and the other engaging and being adapted to move the end portion of said arm, a pair of levers pivotally connected having pairs of adjacent ends, one end of one lever being operatively connected to one of said relatively movable parts, the adjacent end of the other lever being operatively connected to the other relatively movable part, and each of the other of said pair of adjacent ends being adapted to engage said member to be tested, means connected to said last mentioned pair of adjacent ends adapted to secure them to said member to be tested, said adjacent ends of each pair being adapted to move away from each other in response to expansion of said member to be tested, and resilient means disposed between said relatively movable parts and adapted to move the movable part engaging the end portion of said arm outwardly of said channel in response to the separatory movement of the ends of said levers.

2. Apparatus for indicating the extension of a member during test comprising a support, an arm connected to said support for movement relative thereto, means operatively connected to said arm for indicating the movement thereof, and means acting on said arm for moving the same in response to extension of the member during test, said last named means comprising telescoped parts one engaged with the arm for moving the same in response to such relative movement, and relatively movable link members connected with said parts for relative movement of the latter in response to relative movement of the link members, means adapted to connect the link members with the test member for relatively moving the link members in response to stress extension of the test member, and spring means connected between said parts and urging said parts apart into engagement with said link members.

3. Apparatus for indicating the extension of a test member to be stretched comprising a base member, an arm pivotally mounted on said base member, means operatively connected to said arm for indicating the movement thereof, and means linking said test member with said arm for transmitting the expansive movement thereof comprising an expansible device including two telescoped parts adapted to be moved away from each other, one of said parts being fixed relative to said base member and the other part engaging and being adapted to move said arm, means limiting the relative movement of said parts, a pair of pivotally connected levers having first and second pairs of adjacent ends, said first pair being detachably seated against said telescoped parts and said second pair being adapted to engage said test member in a movement transmitting relationship, said adjacent ends of said pairs being adapted to separate in response to stretching movement of said test member, and resilient urging said telescoped parts apart and adapted to maintain said first pair of ends of said levers seated against said parts during stretching movement of said test member, said first pair of adjacent ends of said levers being adapted to unseat from said telescoped parts in response to breakage of said test member.

4. Apparatus for indicating the extension of a test member to be stretched comprising a base member forming a channel, an expansible device disposed in said channel including first and second parts movable relative to each other, means fixing said first part relative to said base member, an arm carried by said base member extending into said channel and engaging said second part, means operatively connected to said arm for indicating the movement of said arm and of said second part, a pair of pivotally connected levers having first and second pairs of adjacent ends, said first pair being detachably seated against said movable parts and second pair being adapted to engage said test member in a movement transmitting relationship, said adjacent ends of said pairs being adapted to separate in response to stretching movement of said test member, and means carried by said device and maintaining said first pair of adjacent ends seated on said parts.

5. Apparatus for indicating the extension of a test member to be stretched comprising a base member forming a channel, an expansible device disposed in said channel including first and second parts movable relative to each other, means fixing said first part relative to said base member, an arm carried by said base member extending into said channel and engaging said second part, means operatively connected to said arm for indicating the movement of said arm and of said second part, spring means coacting between the parts of said device and exerting pressure to separate said parts, and means operatively connecting said device and said test member for transmitting extension of said test member to said device, said last mentioned means having portions engaging said parts and exerting pressure thereon to compensate for the pressure exerted by said spring means.

RICHARD L. JACKMAN.

REFERENCES CITED

The following references are of record in the file of this patent:

UNITED STATES PATENTS

| Number | Name | Date |
|---|---|---|
| 1,397,030 | Benedict | Nov. 15, 1921 |
| 2,180,175 | Sivertsen | Nov. 14, 1939 |
| 2,357,689 | Rondinone | Sept. 5, 1944 |
| 2,378,334 | Sirvent | June 12, 1945 |

FOREIGN PATENTS

| Number | Country | Date |
|---|---|---|
| 87,779 | Switzerland | Apr. 16, 1921 |
| 131,444 | Great Britain | Aug. 20, 1919 |